Nov. 28, 1939.  V. S. FIRESTONE  2,181,398
MACHINE FOR CUTTING STRIP STOCK
Filed Oct. 14, 1938  4 Sheets-Sheet 1

Inventor
Vance S. Firestone
By H. S. M. Howell
Attorney

Nov. 28, 1939.  V. S. FIRESTONE  2,181,398
MACHINE FOR CUTTING STRIP STOCK
Filed Oct. 14, 1938   4 Sheets-Sheet 2

Inventor
Vance S Firestone
W.S.W.Howell
Attorney

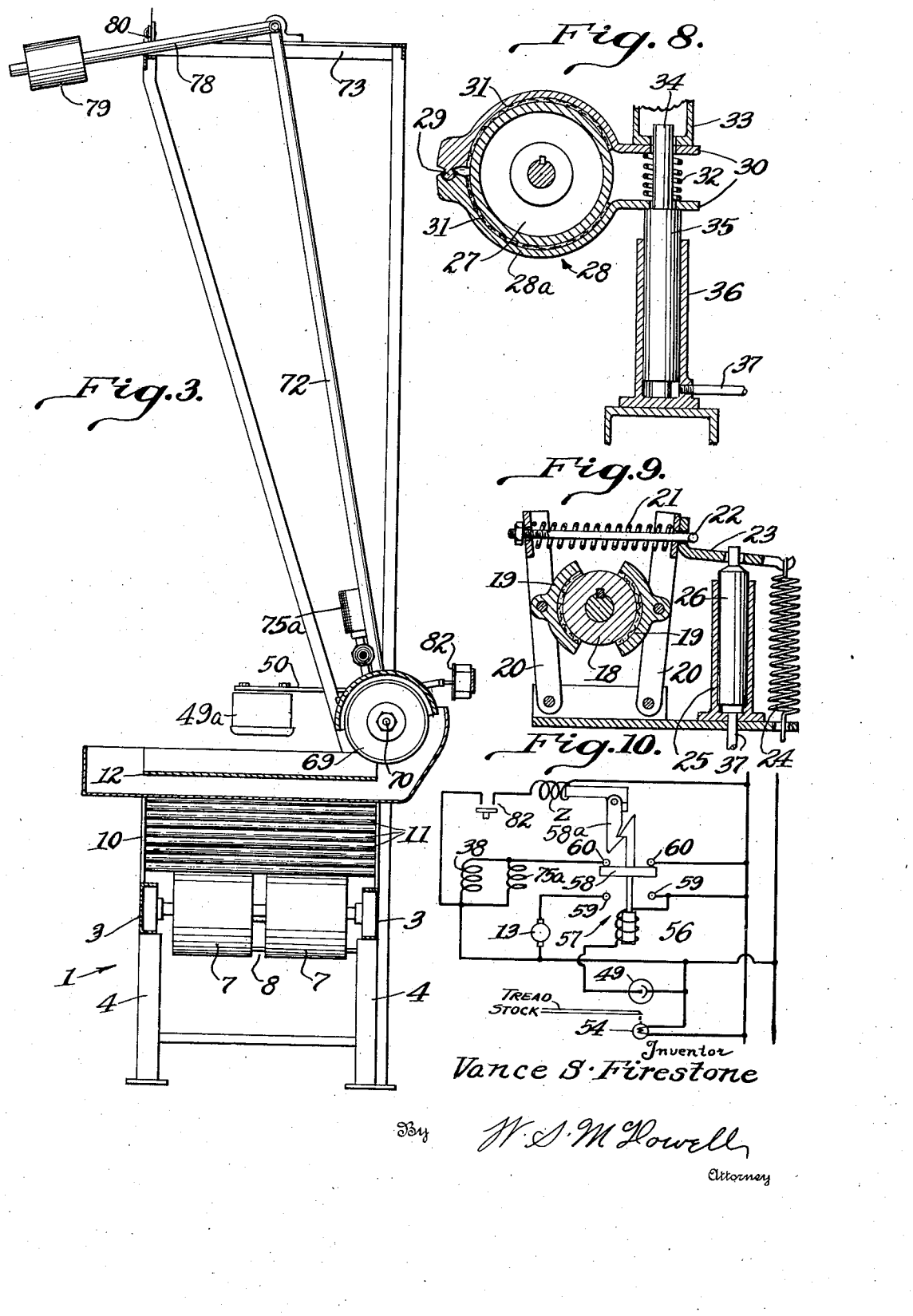

Nov. 28, 1939.   V. S. FIRESTONE   2,181,398
MACHINE FOR CUTTING STRIP STOCK
Filed Oct. 14, 1938   4 Sheets-Sheet 4
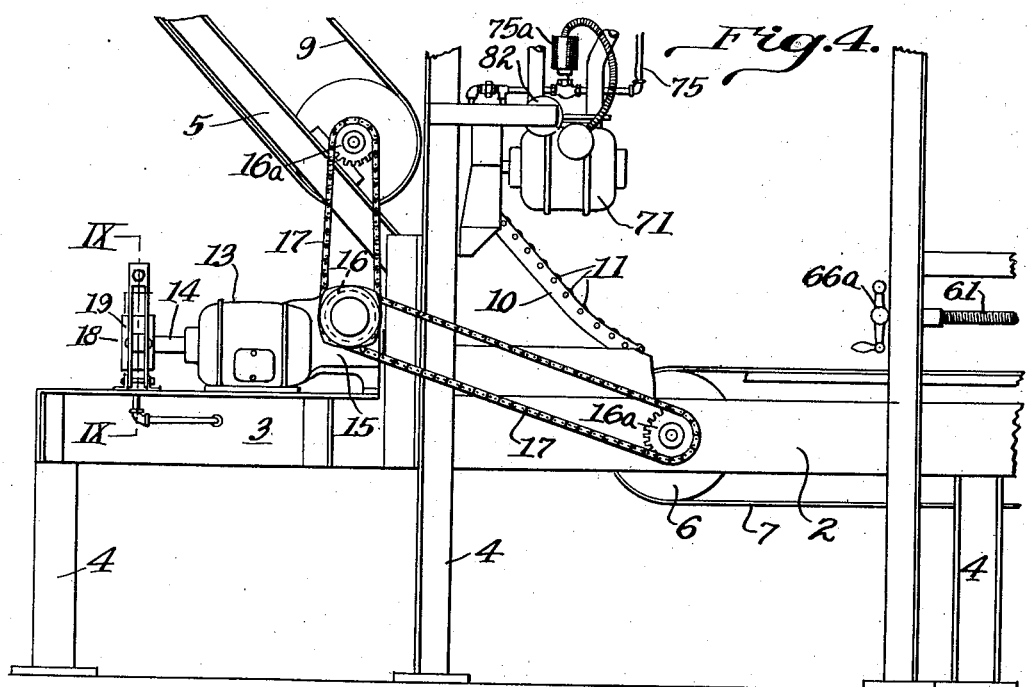
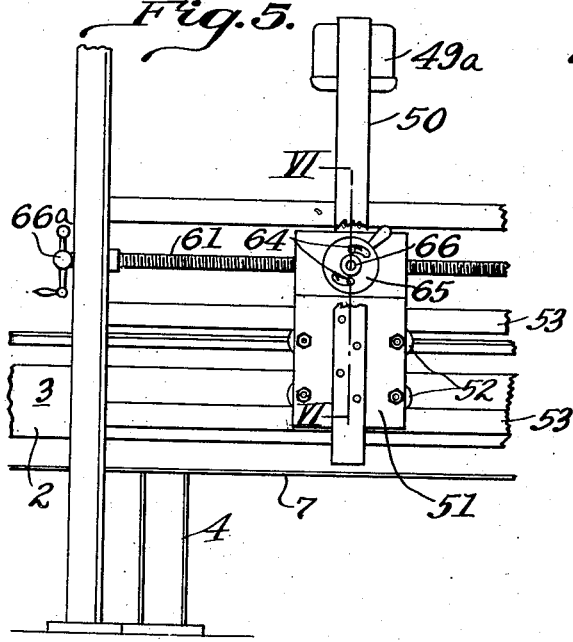
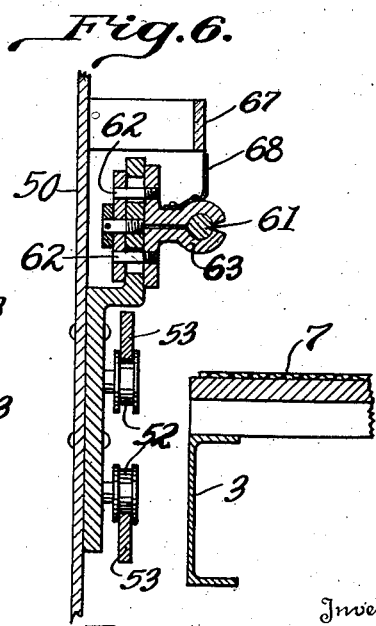
Inventor
Vance S. Firestone
By W. S. McDowell
Attorney Patented Nov. 28, 1939

2,181,398

UNITED STATES PATENT OFFICE 2,181,398

MACHINE FOR CUTTING STRIP STOCK

Vance S. Firestone, Newark, Ohio, assignor to The Pharis Tire and Rubber Company, Newark, Ohio, a corporation of Ohio Application October 14, 1938, Serial No. 235,009

13 Claims. (Cl. 164—76)

This invention relates to the rubber industry and is particularly directed to mechanism employed in this industry. Still more specifically, the invention is directed to a machine for use in cutting strips of tread stock into lengths suitable for use in the manufacture of vehicle tires. Prior to this time, this tread stock has been cut to length by a manual operation, the workman performing the operation cutting the lengths of stock from the supply through the use of shears. This method of cutting the stock is slow and laborious and the cut produced is always jagged since the workman must have considerable skill and take extra care.

When the tread stock is cut, it is desirable to produce a skive cut or bevel in order that the connection produced when the ends are joined will be smooth and of uniform thickness. This beveling increases the difficulty of severing the lengths of material from the supply and the time required to perform the operation.

It is the primary object of the invention to provide a machine to cut the tread stock into predetermined lengths, the length of the strip cut being automatically determined. Machines to cut the tread stock to desired lengths have been previously provided but these machines were made to perform this operation while the tread material was moving on a conveyor. This method of cutting made the machines complex and difficult to operate. They also were apt to become out of order easily and would produce inaccurate results.

It is an object of the invention, therefore, to provide a machine to skive cut the strips to a predetermined length and to perform this operation while the tread stock is held stationary.

A further object of the invention resides in the provision of an inclined conveyor over which the tread stock moves, the machine also being provided with a continuously rotating disk-type knife which moves across the conveyor in a vertical plane to sever the length of stock from the supply.

A still further object of the invention resides in the provision of a light-responsive circuit-controlling device positioned in spaced relation from the cut-off knife. The light responsive mechanism is connected with electroresponsive devices which, when the beam of light passing to the light responsive device is interrupted by the tread stock, will stop the conveyor to hold the stock stationary while the transverse cut is being made.

It is also an object of the invention to space the machine for cutting the stock from the delivery end of a continuously driven conveyor leading from the extruding machine or other source of supply, this space serving to permit the tread stock to dip down thereinto when the conveyor of the cutting machine stops while the length of material is being cut off. The conveyors of the cutting machine are arranged to move at a greater speed than the conveyor leading from the extruding machine in order to absorb the excess material which was permitted to gather at the space between the cut-off machine and the delivery end of the conveyor feeding stock thereto.

A still further object of the invention resides in the provision of a machine of the type mentioned having a pair of conveyor sections, one being inclined and the other being disposed in a substantially horizontal plane. The first section is spaced from the horizontal section and a bank of rollers is positioned in this space, there being a transversely extending channel arranged below the upper surface of the rollers for the reception of the edge of the rotating knife. This channel serves to back up the stock while the cut is being produced.

An object of the invention also resides in providing the horizontal conveyor just mentioned with a pair of transversely spaced endless belts and to position a light-responsive circuit-controlling device in registration with the space between the belts so that when material is conveyed over the belts, a beam of light passing through the space between the belts will be intercepted by the material on the conveyor.

It is a still further object of the invention to provide a machine of the type mentioned with driving means for the conveyors and to provide means for arresting motion on the part of the driving means and the conveyor in order that these devices may be instantly stopped when the proper length of tread stock has moved beyond the cutting knife.

With the above and other objects in view which will be apparent from the following description, the invention consists in the novel features of construction and arrangement of parts more particularly set out in the following description of the preferred form of the invention illustrated in the accompanying drawings, wherein:

Fig. 3 is a vertical transverse sectional view taken through the machine illustrated in Fig. 1, the plane of this section being indicated by the line III—III of Fig. 1.

Fig. 4 is a side elevation of the machine shown in Fig. 1 looking toward the side opposite that illustrated in Fig. 1. This view shows the mechanism for driving the conveyors of a machine.

Fig. 5 is a side elevation of the light responsive circuit controlling mechanism and the means for adjusting it longitudinally of the conveyor.

Fig. 6 is a vertical transverse sectional view taken on the plane indicated by the line VI—VI of Fig. 5;

Fig. 7 is a detail vertical sectional view taken through an electroresponsive valve mechanism used in the machine;

Fig. 8 is a similar view taken through a fluid pressure operated brake used to arrest motion on the part of the conveyor.

Fig. 9 is also a similar view of the mechanism used to prevent over-run on the part of the driving motor when the current supply thereto has been interrupted, the plane of this figure being indicated by the line IX—IX of Fig. 4.

Fig. 10 is a diagrammatic view of the electrical circuit employed in the machine.

Figure 1:
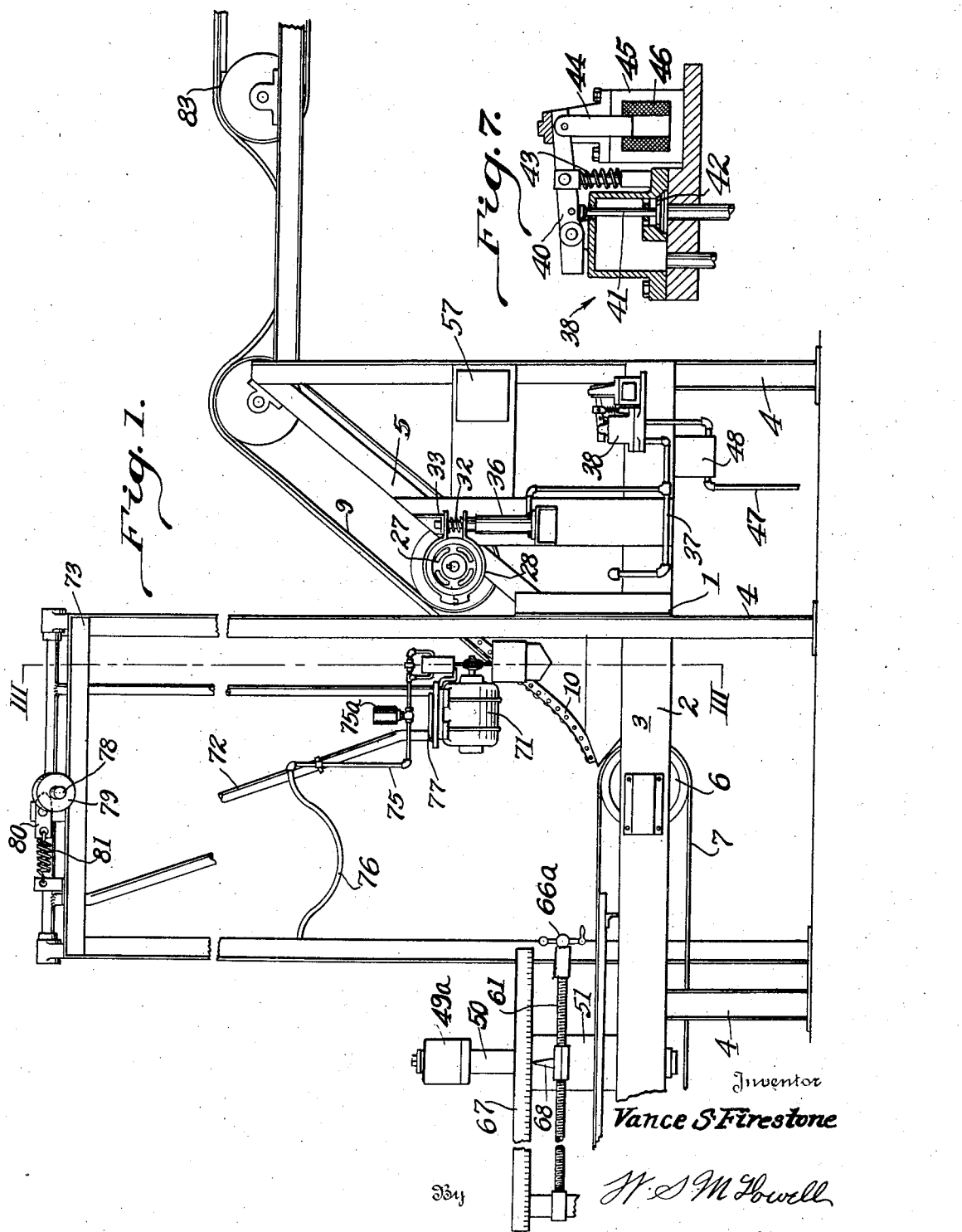
Fig. 1 is a side elevational view of a tread stock cutting machine formed in accordance with the present invention.
Figure 2:
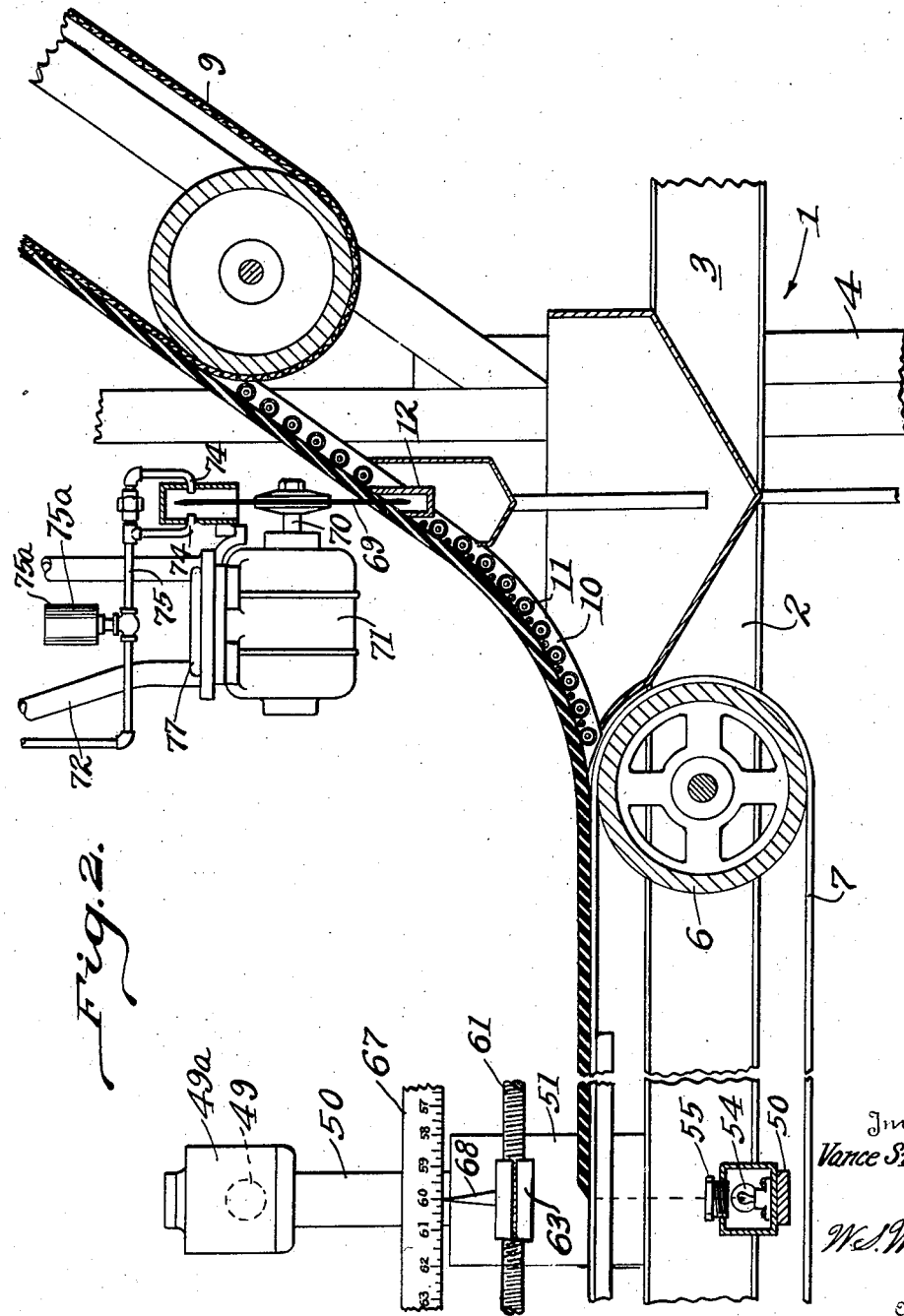
Fig. 2 is an enlarged vertical longitudinal sectional view taken through the machine shown in Fig. 1 at the point where the mechanism for making the transverse cut is located.

Referring more particularly to the drawings, the numeral 1 designates the frame of the tread cutting machine comprising the present invention. This frame is formed to include a horizontal bed 2 composed of oppositely arranged channel members 3—3. These channel members are held in an elevated position by means of leg members 4. The leg members at one end of the machine project a considerable distance above the channel members 3 and are connected at their upper ends by an inclined frame bar 5. The channel members 3 support for rotation therebetween a plurality of drums 6 about which are trained endless belt sections 7. These belt members are spaced as at 8 to provide a longitudinally extending opening at the center of the conveyor formed thereby. The frame members 5 also have journaled therein a plurality of spaced drums around which is trained an endless fabric belt 9 which forms an inclined conveyor section. The delivery end of the section 9 is spaced from the receiving end of the horizontal conveyor formed by the belts 7 and an inclined frame 10 is provided in this space. Between the sides of the frame 10, there is provided a plurality of rotatable roller members 11 over which material may move when passing from the inclined to the horizontal conveyor. At a point spaced from the lower end of the frame 10, there is provided a transversely extending channel 12, the side edges of this member being beveled to conform to the angularity or inclination of the conveyor 9 and the frame 10. The upper edges of the channel are disposed substantially in registration with the outer periphery of the rollers so that the tread stock will be engaged thereby as it moves downward over this section of the conveyor. To impart movement to the conveyor, the frame at one side near the forward end is provided with an electric motor 13, the armature shaft 14 of which extends into a reduction gear casing 15. The mechanism in this case imparts movement from the motor to sprockets 16. The shafts forming the pivotal support for the drums of the conveyor section also are provided with sprockets 16a which are connected by means of chains 17 with the sprockets 16 in order that movement of the latter will result in similar movement being imparted to the drums which will in turn cause longitudinal movement of the conveyor belts.

The armature shaft of the motor extends outwardly a considerable distance and has a disk 18 keyed for rotation therewith. Arranged to engage the disk 18 is a pair of brake shoes 19 each pivotally carried by a pair of rocking levers 20. The upper ends of the pairs of levers are connected and a spring 21 is positioned between the pairs of levers to resiliently hold them separated and the brake shoes spaced from the disk 18. A bar 22 also extends between the upper ends of the levers 20 and is connected at one end with a bell crank 23 used to force the upper ends of the bars together when it is desired to apply the brake shoes 19 to the disk 18. A spring 24 is connected to one arm of the bell crank to hold it in a brake releasing position.

To operate the bell crank, there is provided an air cylinder 25 in which is slidably mounted a piston 26 connected at its upper end with the bell crank. When pressure is introduced into the lower end of the cylinder 25, the piston will move upwardly, imparting similar movement to the bell crank which, in turn, will move the upper ends of the levers 20 together, causing the brake shoes to apply friction to the disk 18. This friction will be of sufficient intensity to prevent any overrun of the electric motor after the current supply thereto has been interrupted.

On the end of the drum shaft of the inclined conveyor opposite that to which the sprocket 16a is attached, there is provided a wheel 27 and arranged to cooperate therewith is a brake mechanism 28 comprising a pair of arcuate sections 28a pivotally connected at one end as at 29, the opposite ends of the sections terminating in outwardly directed lugs 30. Strips of lining material 31 are secured to the inner face of the sections 28a to increase the braking power and prevent injury to the wheel 27. A coil spring 32 is positioned between the spaced lugs 30 in order to resiliently hold the lining in spaced relation from the surface of the wheel. One of the lugs 30 engages a stationary part 33 of the machine frame and both of the lugs are provided with registering perforations for the reception of a reduced extension 34 formed with the upper end of a piston 35. This piston is positioned for sliding movement in a cylinder 36 secured at one end to a stationary part of the machine frame.

When compressed air or other fluid is introduced into the lower end of the cylinder, the piston will move upwardly and similar motion will be imparted to one of the lugs 30. Since the sections 28a are hinged together, the upward movement of the lug will result in a pinching or pressure applying action being imparted to the wheel 27. This action will retard the rotation of the wheel and consequently the shaft to which it is keyed. Since this shaft carries one of the drums of the inclined section of a conveyor, this drum will also be retarded and the feeding action of the conveyor discontinued.

A compressed fluid is supplied to the cylinders 25 and 36 by means of a pipe line 37 in which is positioned an electromagnetic valve 38. The valve 38 controls the flow of fluid under pressure to the cylinders 36 and 25. As shown in Fig. 7, the valve 38 is provided with a pivoted rocker arm 40 to which a valve rod 41 is secured. This rod extends into the body of the valve and is provided at its inner end with a port closing disk 42.

A spring 43 disposed between the arm 40 and the body of the valve serves to resiliently hold the valve in position to prevent fluid flow.

The outer end of the arm 40 has the armature 44 of an electric-solenoid 45 pivotally secured thereto. When the field winding 46 of the solenoid is energized, the armature will be drawn into the space provided therefor in the field coil and the disk 42 will be moved away from the seat to permit fluid to flow through the valve to the pipe lines 37. The upper end of the valve rod is provided with a shoulder which engages the valve body when the valve is moved to an open position and prevents loss of compressed fluid around the valve rod.

When the current flow through the field winding is discontinued and the spring moves the valve 42 to a port closing position, the shoulder at the upper end of the rod will move away from the valve casing and permit the fluid, entrained in the lines 37 and the cylinders 25 and 36, to bleed out and the pistons to return to a normal position.

A pipe line 47 leading from a suitable source of compressed fluid supplies the fluid necessary to operate the machine. This line contains a surge tank 48 in order that the pressure to operate the pistons will be substantially constant.

The automatic control for the machine comprises a photoelectric cell 49 or similar light responsive device which is contained in a housing 49a secured to a bracket 50, the latter being mounted in connection with a carriage 51. This member is formed to include a plurality of rollers 52 arranged to move over spaced bars 53 carried by the machine frame at the side of the horizontal section of the conveyor. The lower end of the bracket 50 is provided with an incandescent lamp 54 above which is located a lens carrying member 55. The photoelectric cell 49 and the lamp 54 are arranged in vertical registration with each other and the space between the belt sections of the horizontal conveyor. This arrangement provides for the passage of a beam of light from the lamp 54 to the photoelectric cell as long as no material is positioned on the conveyor at a point therebetween. When the material being conveyed reaches a point in registration with the lamp and the photoelectric cell, the beam of light will be intercepted and a circuit containing the actuating coil 56 of a relay switch 57 will be completed. The excitation of the coil 56 will result in drawing the bridge 58 of the relay switch away from a pair of contacts 59 positioned in the motor circuit. This movement will also move the bridge 58 into engagement with a second pair of contacts 60 to complete the circuit to the electro-magnetic valve 38. The bridge element 58 is held in this latter position by a mechanical latch 58a disposed in a position to engage a hook-like portion on the member 58. When the relay switch is thus positioned, flow of electrical current to the driving motor will stop and the valve 38 will operate to permit compressed fluid to flow to the brake cylinders 25 and 36. This will result in the application of the brakes to immediately stop the rotation of the motor and the movement of the conveyors.

This mechanism is used to regulate the length of tread stock to be severed from the supply. The length may be varied by moving the light sensitive mechanism and the light source longitudinally of the horizontal conveyor by means of a screw shaft 61 journaled in connection with the machine frame. The carriage 51 is provided with an offset portion having a pair of slots in its upper end through which studs 62 project. These studs are carried by separable nut sections 63 positioned adjacent the screw 61. The outer ends of the studs 62 are received within cam slots 64 formed in an adjusting member 65 pivoted as at 66 to the offset portion of the carriage body.

By turning the adjusting member counterclockwise, the nut sections may be separated to free the outer portions from the screw 61 and the carriage supporting the bracket 50 and the light-responsive mechanism may then be manually moved longitudinally of the conveyor to a point near the desired length of tread stock to be cut. The member 65 may then be rotated in a clockwise direction to cause the ends of the nut sections to be clamped into engagement with the screw. The screw may then be rotated by means of the handle member 66a to perform the final operation of positioning the light sensitive mechanism.

A graduated gage bar 67 is disposed above the track for the carriage and one of the nut sections is provided with a pointer 68 adjacent the gage bar to enable the operator to position the light-responsive mechanism with speed and precision at the correct point for the length of stock desired.

To sever the required length of tread stock from the supply, use is made of a disk type knife 69. This knife is mounted upon the outer end of the armature shaft 70 of an electric motor 71 which is secured to the lower end of a triangular support 72. The upper end of the triangular support is journaled for swinging movement on an elevated framework 73. The knife 69 is disposed in a vertical plane and the pivots for the support are so arranged that the support will move the knife in the vertical plane in which it is positioned. This plane extends transversely of the conveyor at the point where the channel 12 is disposed. The lower edge of the knife is positioned for movement in the channel and when the support is moved on its pivot, the knife will pass from one side of the conveyor to the other. When tread stock is positioned on the conveyor, the knife will, of course, pass through the tread stock and sever a section therefrom. The length of the section is determined by the spacing of the light sensitive mechanism from the channel 12. The inclination of the conveyor at the point where the knife is positioned causes the tread stock to be cut on a bevel. The angularity of each of the bevel cuts will be uniform due to the fact that the inclination of the conveyor is permanent and the knife always moves in the same plane.

To facilitate the passage of the knife through the tread stock, there has been provided means for circulating or applying a lubricating medium, such as water, to the knife. This water applying means takes the form of a pair of nozzles 74 connected to a pipe line 75 carried with the motor support 72. A flexible hose 76 joins the end of the pipe 75 to the stationary part of the frame and permits the pipe to move with the support. An electromagnetic valve 75a is positioned in the line 75 to control the flow of lubricating medium to the nozzles. The field coil of this valve is connected in circuit with that of the valve 38 and will be operated to open the valve and supply lubricating medium when the conveyor is stopped by the light sensitive mechanism. The upper portion of the knife is provided with a guard to protect the operator and the nozzles 74 project through the sides of this guard. The support is provided with hand grip 77 by means of which the motor and the knife may be conveniently operated.

Connected to the upper end of the support is a laterally extending bar 78 on which is positioned a weight 79 used to counterbalance the load of the motor and the cooperative mechanism. By counterbalancing this load, the operator is merely required to exert force sufficient to move the knife through the rubber tread stock. A pivoted plate 80 is secured to the frame 73 to be engaged by the bar 78 in order to hold the motor and the knife in an inactive position. The outer end of the plate 80 has a coil spring 81 secured thereto, the opposite end of the spring being connected with the frame to supply a tension to the plate to resiliently resist the release of the bar.

When the motor is moved to an inactive position, a portion of the triangular support engages the actuating member of a normally open switch 82 and moves it to a closed position. This switch thus closed, completes a circuit containing the coil Z of a solenoid used to operate the latch 58a and the member 58 will be released to again complete the circuit to the conveyor motor. The latch prevents the movement of the member 58 to a position to complete the circuit containing the conveyor motor until the safety switch 82 is actuated after the operation of severing the tread stock.

At the forward end of the tread severing machine and spaced therefrom is the delivery end 83 of a feed conveyor extending from an extruding machine, not shown, which supplies the tread stock. The space between the two conveyors or the conveyor 83 and the tread severing machine is provided to permit the tread stock to dip down when the conveyors of the cutting machine stop to permit the transverse cut to be made. The conveyor 83 is continuously operated and the speed of the conveyors in the cutting machine is at a slightly higher rate than that of the conveyor 83 in order that the slack which permits the tread stock to dip between the conveyors will be taken up when the cutting machine conveyors again commence operation.

The operation of the machine above described is as follows:

The tread stock is fed from an extruding machine or other suitable source on the conveyor 83. It then passes onto the inclined section of the conveyor on the cutting machine. The stock then moves from the inclined section to the horizontal section and when the forward end of the strip stock reaches a point in registration with the light sensitive mechanism, the driving mechanism for the conveyors of the cutting machine will stop. The knife is then swung on its frame. This swinging movement will cause the knife to pass through the tread stock and sever the piece extending from the knife to the light sensitive mechanism from the supply. When the knife and the motor are swung back to their normal position, the switch 82 will be closed and when the section of tread stock just cut off is moved from between the light sensitive cell and the light source, the relay switch will then be operated to permit the contacts 59 to be bridged and complete the circuit for the conveyor driving motor. When the contacts 59 are connected, the contacts 60 will be separated and the circuit leading to the valves 38 and 75a will be broken. This will cause the brakes on the conveyor and the motor shaft to be released and the valve, controlling the flow of lubricating medium to the knife, closed. The machine is then in condition to pass through another cycle. Sheet metal troughs are provided beneath the channel 12 to catch the lubricating medium during the cutting operation.

While there has been shown and described the invention in its preferred form, numerous minor changes in the construction and relation of parts may be made without departing from the spirit and scope of the invention as defined in the following claims.

What is claimed is:

1. Apparatus for cutting strip rubber into predetermined lengths comprising a power driven conveyor having an inclined section, a light sensitive switch positioned adjacent said conveyor in spaced relation to said inclined section, means for directing a beam of light toward said switch, said beam passing through the path of movement of the material on said conveyor, electroresponsive means connected with said light sensitive switch and operative to arrest the movement of the conveyor when the beam of light is intercepted, and a motor driven circular knife mounted for movement in a plane extending transversely of the conveyor at the inclined portion of the conveyor to sever the material thereon.

2. Apparatus for cutting strip rubber into predetermined lengths comprising a power driven conveyor having an inclined section, a light sensitive switch positioned adjacent said conveyor in spaced relation to said inclined section, means for directing a beam of light toward said switch, said beam passing through the path of movement of the material on said conveyor, means for moving the source of said beam and said light sensitive switch relative to the inclined section of the conveyor to vary the length of the strips to be cut, electroresponsive means connected with said light sensitive switch and operative to arrest the movement of the conveyor when the beam of light is intercepted, and a motor driven circular knife mounted for movement in a plane extending transversely of the conveyor at the inclined portion of the conveyor to sever the material thereon.

3. Apparatus for cutting strip rubber into predetermined lengths comprising a power driven conveyor having an inclined section, a light sensitive switch positioned adjacent said conveyor in spaced relation to said inclined section, means for directing a beam of light toward said switch, said beam passing through the path of movement of the material on said conveyor, electroresponsive means connected with said light sensitive switch and operative to arrest the movement of the conveyor when the beam of light is intercepted, a motor driven circular knife mounted for movement in a plane extending transversely of the conveyor at the inclined portion of the conveyor to sever the material thereon, and means for applying a lubricant to said knife during the severing operation.

4. Apparatus for cutting strip rubber into predetermined lengths comprising a power driven conveyor having an inclined section, a light sensitive switch positioned adjacent said conveyor in spaced relation to said inclined section, means for directing a beam of light toward said switch, said beam passing through the path of movement of the material on said conveyor, electroresponsive means connected with said light sensitive switch and operative to arrest the movement of the conveyor when the beam of light is intercepted, and a motor driven circular knife mounted for swinging movement in a plane extending transversely of the conveyor at the inclined portion of the conveyor to sever the material thereon.

5. Apparatus for cutting strip rubber into predetermined lengths comprising a power driven conveyor having an inclined section, a rotatable circular knife mounted for movement in a plane extending transversely of said conveyor at the inclined portion, a channel extending transversely of the conveyor below the upper surface thereof, the edge of said knife extending into said channel, a light actuated switch positioned adjacent said conveyor at a point spaced from said channel, means for directing a beam of light toward said switch, said beam projecting through the path of movement of the material on said conveyor, and electroresponsive means for arresting the movement of said conveyor when the beam of light passing to said switch is intercepted.

6. Apparatus for cutting strip rubber into predetermined lengths comprising a conveyor having an inclined section, a frame positioned over said conveyor at the inclined portion, a motor pivotally supported on said frame for swinging movement in a plane extending transversely of said conveyor, a circular knife secured to the shaft of said motor, the edge of said knife passing through a transversely extending slot formed in the inclined section of said conveyor when said motor is moved on its pivot, a light responsive switch positioned adjacent the conveyor at a point spaced from the path of said knife, means for directing a beam of light toward said switch, said beam projecting through the path of movement of the material on said conveyor, and electroresponsive means for substantially instantly stopping said conveyor when the beam of light is intercepted.

7. In apparatus for cutting strip rubber into predetermined lengths, a continuously operating conveyor, a second conveyor disposed in spaced relation to said first conveyor, said second conveyor being operated at a faster rate of speed than said first conveyor and having an inclined section, a framework extending over the inclined portion of said second conveyor, a motor-equipped support pivotally mounted on said framework for movement in a plane extending transversely of said conveyor, a disk knife carried by the shaft of said motor, the edge of said knife passing through a transversely extending slot formed in the inclined section of said second conveyor when said motor support is moved on the pivot therefor, a light sensitive switch disposed adjacent said second conveyor in spaced relation to the slot for said knife, means for directing a beam of light toward said switch, said beam projecting through the path of movement of the material on the second conveyor, and electro-responsive mechanism for stopping said second conveyor when the beam passing to said switch is intercepted.

8. In apparatus for cutting strip rubber into predetermined lengths, a conveyor having an inclined section, a framework extending over the inclined portion of said conveyor, a motor equipped support pivotally mounted on said framework for movement in a plane extending transversely of said conveyor, a disk knife carried by the shaft of said motor, the edge of said knife passing through a transversely extending slot formed in the inclined section of said conveyor when said motor support is moved on the pivot therefor, a light sensitive switch disposed adjacent said conveyor in spaced relation to the slot for said knife, means for directing a beam of light toward said switch, said beam projecting through the path of movement of the material on the conveyor, brake means connected with said conveyor, and electroresponsive mechanism for effecting the actuation of said brake means to stop said conveyor when the beam passing to said switch is intercepted.

9. In apparatus for cutting strip rubber into predetermined lengths, a continuously operating conveyor, a second conveyor disposed in spaced relation to said first conveyor, said second conveyor being operated at a faster rate of speed than said first conveyor and having an inclined section, a framework extending over the inclined portion of said second conveyor, a motor equipped support pivotally mounted on said framework for movement in a vertical plane extending transversely of said conveyor, a disk knife carried by the shaft of said motor, the edge of said knife passing through a transversely extending slot formed in the inclined section of said second conveyor when said motor support is moved on the pivot therefor, a light sensitive switch disposed adjacent said second conveyor in spaced relation to the slot for said knife, means for directing a beam of light toward said switch, said beam projecting through the path of movement of the material on the second conveyor, and electroresponsive mechanism for stopping said second conveyor when the beam passing to said switch is intercepted.

10. In apparatus for cutting strip rubber into predetermined lengths, a continuously operating conveyor, a second conveyor disposed in spaced relation to said first conveyor, said second conveyor being operated at a faster rate of speed than said first conveyor and having an inclined section, a framework extending over the inclined portion of said second conveyor, a motor equipped support pivotally mounted on said framework for movement in a plane extending transversely of said conveyor, a disk knife carried by the shaft of said motor, the edge of said knife passing through a transversely extending slot formed in the inclined section of said second conveyor when said motor support is moved on the pivot therefor, a light sensitive switch disposed adjacent said second conveyor in spaced relation to the slot for said knife, means for directing a beam of light toward said switch, said beam projecting through the path of movement of the material on the second conveyor, mechanism for supporting said light beam directing means and said switch, means for adjusting said supporting mechanism relative to the slot for said knife, and electroresponsive mechanism for stopping said second conveyor when the beam passing to said switch is intercepted.

11. In apparatus for cutting tread stock into predetermined lengths, a continuously operating conveyor, a second conveyor disposed in spaced relation to the delivery end of the first conveyor, said second conveyor having an inclined portion and a substantially horizontal portion, said horizontal portion including a pair of laterally spaced belts, an inclined frame positioned between the inclined and horizontal portion of said second conveyor, a bank of rollers mounted in said inclined frame, a channel member extending transversely of said frame, a motor equipped support pivoted above the second conveyor for swinging movement in a plane transverse thereto, a disk knife driven by and swingable with said motor, the edge of said knife extending into said channel member, a light responsive device positioned adjacent the belts forming the horizontal portion of said second conveyor in registration with the space therebetween, means disposed on the opposite side of said belts and in registration with the light responsive device to direct a beam of light thereon, and electroresponsive mechanism connected with said light responsive device for stopping said second conveyor when the beam passing between said belts is intercepted.

12. In apparatus for cutting tread stock into predetermined lengths, a conveyor for supporting strip material for longitudinal travel, driving means for said conveyor, a disk knife journaled for rotary movement in a plane disposed at an oblique angle to the upper surface of and intersecting said conveyor, a motor connected with said knife for imparting rotation thereto, means supporting said knife for movement across said conveyor in the plane of rotation of said knife, a light sensitive switch disposed adjacent the said conveyor in spaced relation to said knife, means for directing a beam of light toward said switch, said beam projecting through the path of movement of material on said conveyor, and electroresponsive means for stopping said conveyor, when the beam directed toward said switch is interrupted, to hold said stock stationary during the cutting operation.

13. In apparatus for cutting tread stock into predetermined lengths, a conveyor for supporting strip material for longitudinal travel, motor driven means for operating said conveyor, brake means for instantly stopping said conveyor driving means, electroresponsive means for controlling the actuation of said brake means, a disk knife journaled for rotary movement in a plane disposed at an oblique angle to the upper surface of and intersecting said conveyor, motor means connected with said knife for imparting rotation thereto, means supporting said knife for movement across said conveyor in the plane of rotation of said knife, electrically actuated main switch means for controlling the flow of current to said conveyor driving motor and said electroresponsive brake controlling means, and additional switch means positioned adjacent the conveyor and connected in circuit with the actuating means for said main switch, said additional switch means being operated by the movement of material on said conveyor to control the operation of the conveyor.

VANCE S. FIRESTONE.